Aug. 3, 1926.
A. NORDIN
1,594,374
PENSTOCK GATE
Filed Jan. 19, 1924
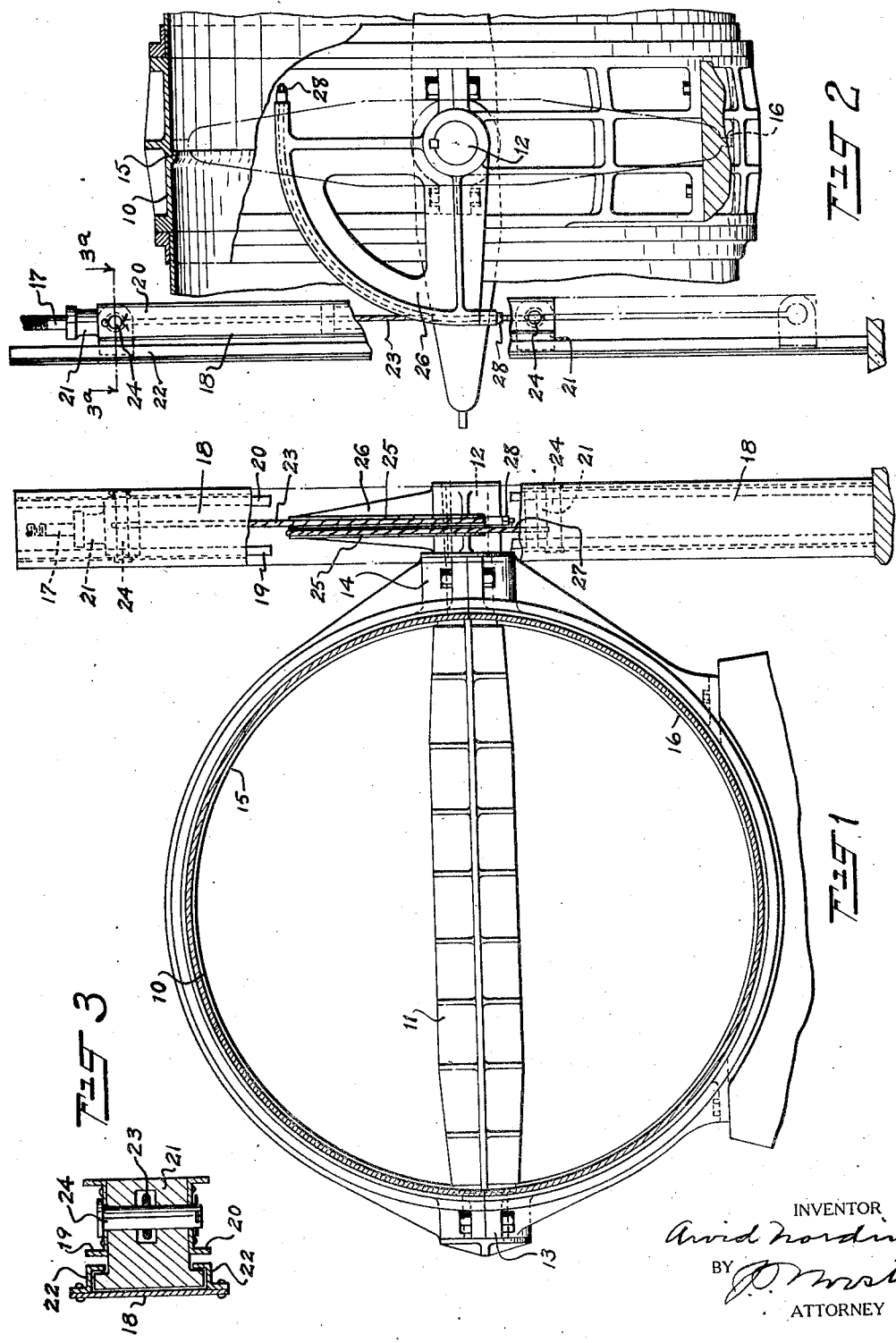

Patented Aug. 3, 1926.

1,594,374

UNITED STATES PATENT OFFICE.

ARVID NORDIN, OF CRANFORD, NEW JERSEY, ASSIGNOR TO M. H. TREADWELL COMPANY, OF NEW YORK, N. Y., A CORPORATION OF NEW YORK.

PENSTOCK GATE.

Application filed January 19, 1924. Serial No. 687,229.

This invention relates to actuating mechanism for penstock gates especially of the oscillatory or butterfly type, and has for its object to provide an actuating mechanism capable of being connected up to the various types of overhead power plants now used, and to avoid the objections incident to devices heretofore used.

As will be readily understood, an oscillating gate in a large penstock has to withstand such enormous pressure that an ordinary gear, or worm and sector actuating mechanism becomes impracticable because of the enormous gear tooth pressures developed. The tooth pressure can be reduced by duplication of gearing, but this introduces additional expense in initial as well as maintenance cost, whereas the desire of engineers is to have a simple mechanism especially adapted for the arduous service imposed and also capable of being readily connected to any of the usual forms of overhead actuating mechanism now in use.

With these objects in view I have devised the invention of this application, wherein the shaft extending out through the side of the penstock carries a multiple sector and oppositely extending wire ropes, the ropes being respectively connected to opposite ends of a crosshead, and the crosshead being actuated by the overhead gear. With such a mechanism, gearing as well as friction is eliminated and the strength is only limited by that of the wire ropes employed, so that a very simple device in principle is adaptable for any size of gate. Since the sector, ropes and crossheads will be in the shaft, they can be readily inspected, and lubrication will only be required by the crosshead and shaft bearings.

The invention is shown in the accompanying drawing wherein:—

Figure 1 shows the penstock gate in open position,

Fig. 2 is a side view partly in section of the device shown in Fig. 1, and

Fig. 3 is a section on the line 3ª—3ª of Fig. 2.

The penstock 10 is closed by the rotatable valve 11 of the oscillatory or butterfly type which is mounted on the shaft 12 supported in the bearings 13 and 14. The valve rotates through substantially 90° and when closed is shown by the dotted lines in Fig. 2, when the gate engages the lugs 15 and 16 to prevent further movement thereof. The pressure on the gate on opposite sides of the shaft is substantially balanced except, of course, that the pressure on the lower side is greater due to the additional head due to the diameter of the penstock passageway, and the gate is therefore held in closed position but may be rotated with facility to open the penstock passageway. The actuating motor or other machinery for the valve is generally located above ground rather than at the valve and power for moving the valve is ordinarily transmitted by means of a long actuating rod 17, the lower end of which includes a crosshead 18 comprising side members 19 and 20 connected between end blocks 21 which engage the guides 22. Fixed to each end block 21 by the pin 24 is one or more cables. The cable or cables 23 attached to the upper end block extend downwardly in substantial alignment with the axis of the actuating rod 17, over a portion of the grooved circumference 25 of the sector 26, and secured thereto. The other cable or cables 27 from the lower end block extend upwardly in substantial alignment with the axis of the actuating rod and are fastened to the sector 26 far enough away from the fastening of the first mentioned cable 23 to permit movement of the gate through about 90°. The means for fastening each cable to the sector 26 includes the nut 28 for tightening and adjusting the length of the cable.

Among the advantages of this invention may be included the reduction in friction and elimination of lost motion, by the use of this invention instead of an ordinary gear or worm. Adjustment of the nuts 28 enables the position of the gate to be accurately controlled and enables the cables to be held tight and compensation to be made for wear. The cables may be made as large as necessary and are better adapted to withstand the heavy strains than are the teeth of the pinion. Another advantage is the elimination of any side thrust since the cables extend in substantial alignment with the axis of the actuating rod. The moment arm of the sector is substantially fixed, being always the distance from the centre of the shaft 12 to the axis of the tension members or wire ropes in substantial alignment with the axis of rod 17.

I claim:—

1. The combination with a rotatable gate, of a slidable actuating rod therefor, and means comprising tension members for turning the gate in both directions by transmitting an actuating thrust at a substantially fixed distance from the axis of said gate measured along a line normal to the direction of said thrust.

2. The combination with a movable gate, of a slidable actuating rod therefor, a sector substantially tangent thereto, and a pair of flexible tension members each secured to said rod, one on each side of the point of tangency of the sector, and having the tension members extending in opposite directions over the circumference and secured to said sector.

3. The combination with a rotatable gate, of a slidable actuating rod therefor, and means comprising cables for opening and for closing the gate through about 90° by transmitting an actuating thrust at a substantially fixed distance from the axis of the gate measured along a line normal to the direction of said thrust.

4. The combination with a substantially balanced rotatable gate, of a shaft on which the same is mounted, an actuating rod, guiding means for said rod, a sector secured to said shaft and substantially tangent to the axis of said actuating rod adjacent said guiding means, a cable fixed to the sector, extending over a portion of its circumference, in substantial alinement with the axis of said rod and fixed thereto, and another cable secured to the sector, extending over a portion of its circumference and oppositely in substantial alinement with the axis of said rod, and fixed thereto.

Signed at New York, in the county of New York and State of New York, this 18th day of January, A. D. 1924.

ARVID NORDIN.